(12) United States Patent
Hata

(10) Patent No.: US 8,977,299 B2
(45) Date of Patent: Mar. 10, 2015

(54) MOBILE TERMINAL DEVICE HAVING SETTABLE AND RELEASABLE FUNCTION RESTRICTION AND METHOD THEREOF

(75) Inventor: Mitsutaka Hata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 271 days.

(21) Appl. No.: 13/057,686

(22) PCT Filed: Aug. 7, 2009

(86) PCT No.: PCT/JP2009/064065
§ 371 (c)(1),
(2), (4) Date: Feb. 4, 2011

(87) PCT Pub. No.: WO2010/016593
PCT Pub. Date: Feb. 11, 2010

(65) Prior Publication Data
US 2011/0136515 A1 Jun. 9, 2011

(30) Foreign Application Priority Data
Aug. 8, 2008 (JP) .................................. 2008-206405

(51) Int. Cl.
*H04W 24/00* (2009.01)
*H04M 1/67* (2006.01)
(Continued)

(52) U.S. Cl.
CPC ............ *H04M 1/67* (2013.01); *H04M 1/72577* (2013.01); *H04M 1/72572* (2013.01); *H04M 2250/10* (2013.01); *H04W 48/02* (2013.01)
USPC ........................................ 455/456.4; 455/565

(58) Field of Classification Search
CPC .............. H04M 1/67; H04M 1/72577; H04M 2250/10; H04M 1/72572; H04W 48/02
USPC ................ 455/404.2, 456.1–457, 456.4, 565, 455/418–421, 550.1, 410, 411, 334, 455/343.1–343.5, 574, 404.1; 340/539.13, 340/988–996; D10/104.2; 370/310, 311
See application file for complete search history.

(56) References Cited

U.S. PATENT DOCUMENTS 6,405,031 B1 * 6/2002 Altschul et al. ............... 455/411
6,973,333 B1 * 12/2005 O'Neil ........................ 455/569.2
(Continued)

FOREIGN PATENT DOCUMENTS

JP 2005-117673 A 4/2005
JP 2005-136632 A 5/2005
(Continued)

OTHER PUBLICATIONS

Japanese Office Action "Notification of Reasons for Refusal" dated Jul. 24, 2012; Japanese Patent Application No. 2008-206405; with translation.
(Continued)

*Primary Examiner* — Ronald Eisner
(74) *Attorney, Agent, or Firm* — Studebaker & Brackett PC

(57) ABSTRACT

A mobile terminal device includes: a memory that stores a restriction on a predetermined function or a release condition of the restriction as initial setting information; a determining unit that determines whether a condition of the setting information of the memory is satisfied; a generation unit that generates a restriction change request signal, which changes the initial setting information by a setting information change signal under a condition to change the initial setting information of the memory, and which requests the restriction on a function stored in the memory or the change of the release condition of the restriction when the determining unit determines that the condition of the changed setting information is satisfied; and a restriction release unit which, when detecting the restriction change request signal generated by the generation unit, performs the use restriction on the function or the restriction release based on the changed setting information.

7 Claims, 5 Drawing Sheets

(51) Int. Cl.
*H04M 1/725* (2006.01)
*H04W 48/02* (2009.01)

(56) References Cited

U.S. PATENT DOCUMENTS

| | | | | |
|---|---|---|---|---|
| 8,321,920 | B2* | 11/2012 | Nakajima | 726/7 |
| 2004/0253941 | A1* | 12/2004 | Rivera et al. | 455/408 |
| 2005/0107093 | A1* | 5/2005 | Dowling | 455/456.4 |
| 2005/0120085 | A1* | 6/2005 | Ito et al. | 709/206 |
| 2007/0099631 | A1* | 5/2007 | Lai et al. | 455/456.1 |
| 2007/0142068 | A1 | 6/2007 | Matsuo | |
| 2009/0221266 | A1* | 9/2009 | Ohta et al. | 455/411 |
| 2009/0260069 | A1* | 10/2009 | Nakajima | 726/7 |
| 2011/0141220 | A1* | 6/2011 | Miura | 348/14.02 |
| 2011/0242560 | A1* | 10/2011 | Yamada | 358/1.9 |
| 2013/0040679 | A1* | 2/2013 | Kashiwase | 455/509 |
| 2013/0285983 | A1* | 10/2013 | Kawakubo | 345/174 |

FOREIGN PATENT DOCUMENTS

| | | | | |
|---|---|---|---|---|
| JP | 2005-184153 | A | | 7/2005 |
| JP | 2006-20295 | A | | 1/2006 |
| JP | 2006-186625 | A | | 7/2006 |
| JP | 2007-074703 | A | | 3/2007 |
| JP | WO 2007/043659 | | * 4/2007 | G06F 21/24 |
| JP | 2007-228176 | A | | 9/2007 |
| JP | 2007-274427 | A | | 10/2007 |

OTHER PUBLICATIONS

International Search Report; PCT/JP2009/064065; Sep. 15, 2009.
Japanese Office Action "Notification of Reasons for Refusal" dated Apr. 9, 2013, which corresponds to Japanese Patent Appliaction No. 2008-206405.
Japanese Office Action "Notification of Reasons for Refusal" issued on Dec. 4, 2012, which corresponds to Japanese Patent Application No. 2008-206405.

* cited by examiner

MOBILE TERMINAL DEVICE HAVING SETTABLE AND RELEASABLE FUNCTION RESTRICTION AND METHOD THEREOF

TECHNICAL FIELD

The present invention relates to a mobile terminal device such as a mobile phone, to which a function restriction may be applied and a method of controlling the same.

BACKGROUND ART

Mobile terminal devices such as mobile phones, to which only an administrator may apply a restriction or release the restriction, are widely used in a company and the like.

In a case where an administrator, for example, with a company and the like makes employees carry mobile terminal devices, the administrator may impose restrictions on any functions of a mobile terminal device other than an in-house call function such as electronic mail, thereby permitting the employees to make a phone call only within their company. In this manner, the administrator applies a restriction to a specific function, thereby allowing to make an attempt on enhancement of security.

Patent Literature 1: JP-A-2005-184153

DISCLOSURE OF THE INVENTION

Problems that the Invention is to Solve

However, while the administrator may make an attempt on enhancement in security by imposing a restriction on a specific function of a mobile terminal device, the employees cannot make a phone call using the mobile phone outside the company. Accordingly, in order for the employees to make a phone call outside the company, they need to make the administrator release the restriction on a call function in advance.

Thus, since the administrator needs to carry out setting of a function restriction and releasing of such setting for the mobile terminal device on all such occasions, it is quite inconvenient.

Accordingly, it is required to provide a mobile terminal device and a method of controlling the same that can easily carry out the setting of a function restriction or the releasing of the setting.

Means for Solving the Problems

A mobile terminal device of the invention comprises: a storing unit that stores a restriction on a predetermined function or a release condition of the restriction as an initial setting information; a determining unit that determines whether or not the setting information of the storing unit is satisfied; a generation unit that generates a restriction change request signal, which changes the initial setting information by a setting information change signal under a condition to change the initial setting information of the storing unit, and which requests the restriction on a function stored in the storing unit or the change of the release condition of the restriction when the determining unit determines that the changed setting information is satisfied; and a restriction release unit which, when detecting the restriction change request signal generated by the generation unit, stores the changed setting information in the storing unit and performs the use restriction on the function or the restriction release based on the changed setting information.

Preferably, The mobile terminal device further comprises a receiving unit that receives the changed setting information to store the changed setting information in the storing unit.

Preferably, the mobile terminal device further comprises: a location information receiving unit that obtains a location information on a location of a terminal device itself, wherein the changed setting information stored in the storing unit by the receiving unit comprises a location setting information on location condition of the terminal device itself, and wherein the determining unit compares the location information that is obtained by the location receiving unit with the location setting information of the storing unit and determines whether or not the location of the terminal device itself is in a range of setting region of the location setting information.

Preferably, the mobile terminal device further comprises: a movement speed information receiving unit that obtains a movement speed information on a movement speed resulting from the movement of the terminal device itself, wherein the changed setting information that is stored in the storing unit by the receiving unit comprises a movement speed setting information on a condition of movement speed resulting from the movement of the terminal device itself, and wherein the determining unit compares the movement speed information obtained by the movement speed information receiving with the movement speed setting information of the storing unit and determines whether or not the movement speed resulting from the movement of the terminal device itself is over a setting speed of the movement speed setting information.

Preferably, the mobile terminal device further comprises: a time counting unit that counts time, wherein the changed setting information that is stored in the storing unit by the receiving unit comprises a time setting information on a time condition, wherein the determining unit compares the time counted by the time counting unit with a setting time of the time setting information of the storing unit and determines whether or not the time counted by the time counting unit comes to the setting time of the time setting information.

Preferably, the time counting unit counts accumulative time of the counted time, and the determining unit compares the accumulative time of the counted time that is counted by the time counting unit with the setting time of the time setting information and determines whether or not the accumulative time of the counted time comes to the setting time of the time setting information.

Preferably, the mobile terminal device further comprises: a function of processing electronic mail; and a transmission number receiving unit that obtains a transmission number information on the number of times of electronic mail transmission of the mobile terminal device itself, wherein the changed setting information that stored in the storing unit by the receiving unit comprises a transmission number setting information on a condition of the number of times of electronic mail transmission, and wherein the determining unit compares the transmission number information obtained by the transmission number receiving unit with the transmission number setting information of the storing unit and determines whether or not the number of times of the electronic mail transmission is over a setting transmission number of the transmission number setting information.

A method of setting a lock of a mobile terminal device according to the invention comprises: a first step of storing in a storing unit a use restriction on a function of a mobile terminal device itself or a release condition of the use restriction as a setting information; a second step of determining whether or not the use state of the mobile terminal device satisfies the condition of the setting information of the storing unit; a third step of generating a restriction change request signal that requires a change in a use restriction on the function of the mobile terminal device itself that is stored in the storing unit or a change in a release condition of the use restriction, when the use state of the mobile terminal device satisfies the condition of the changed setting information of the storing unit, based on the setting information changed in response to a setting information change signal for changing the setting information of the storing unit that is obtained by the mobile terminal device itself in the second step; and a fourth step of performing the use restriction on the function of the mobile terminal device itself or the restriction release of the use restriction based on the changed setting information that is stored in the storing unit when the restriction change request signal generated in the first step is detected.

Effects of the Invention

According to the invention, setting of the lock of a mobile terminal device can be performed easily.

BEST MODE FOR CARRYING OUT THE INVENTION

Hereinafter, illustrative embodiments of the invention will be described with reference to the drawings.

Figure 1:
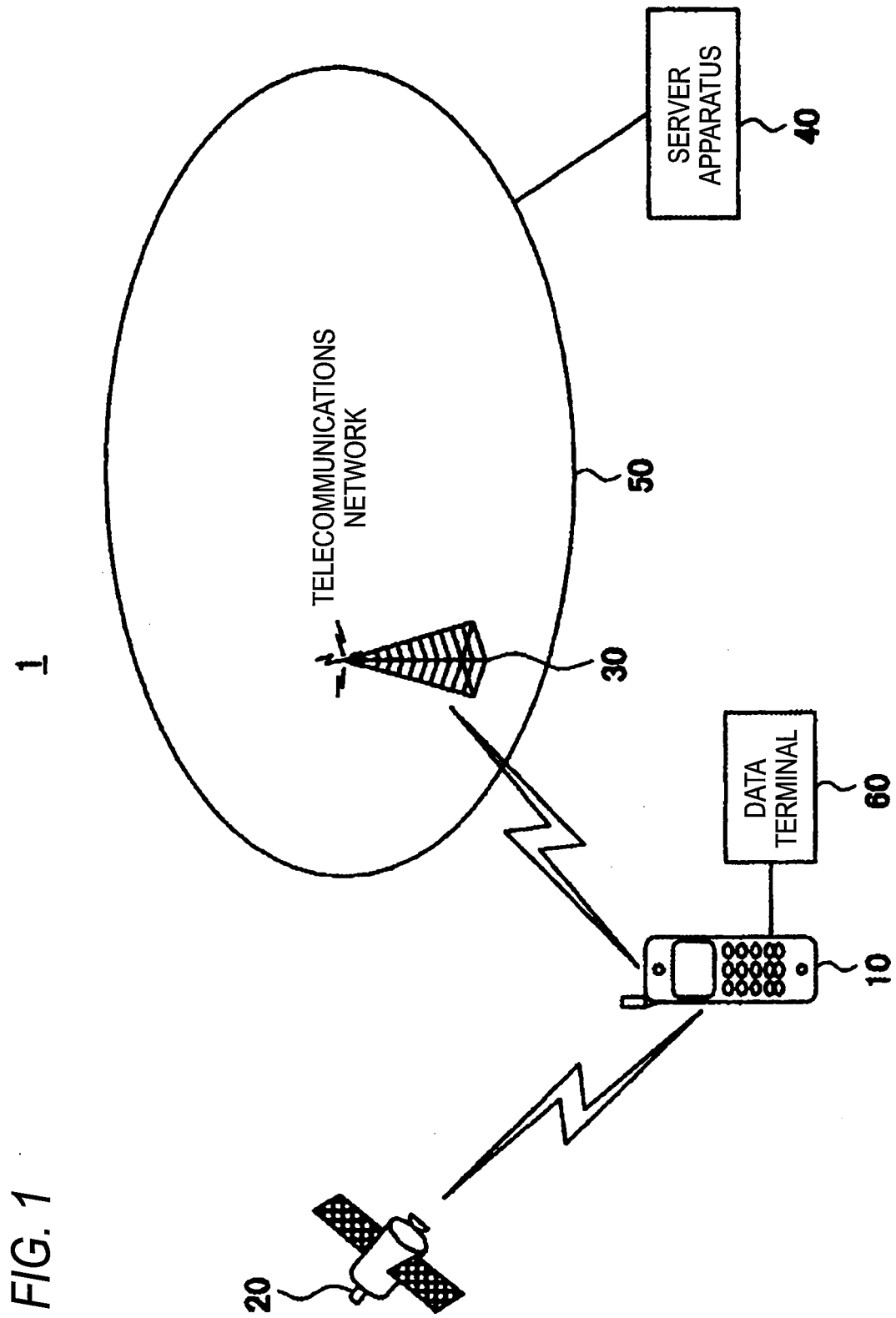
FIG. 1 A view showing the configuration of a communication system according to an illustrative embodiment of the invention.

FIG. 1 is a view showing the configuration of a communication system according to the illustrative embodiment of the invention.

The telecommunication system shown in FIG. 1 includes a mobile terminal device 10, a GPS satellite 20, a base station 30, a server apparatus 40, a telecommunications network 50 and a data terminal 60.

In the illustrative embodiment of the invention, the mobile terminal device 10 is a mobile phone. The mobile terminal device 10 is, for example, a PHS (Personal Handy phone System), but it may be a CDMA terminal or a GSM terminal. The mobile terminal device 10 has various functions for performing, for example, a phonetic communication, writing and sending/receiving of electronic mail, and browsing of a WEB (World Wide Web) site, etc.

The mobile terminal device 10 has a lock function that can restrict the use of a required function and release the restriction. The function restriction includes, for example, the restriction of the counter part of a call, and the restriction on browsing the WEB site. In addition, the function restriction may include the use restriction on a function itself, or the restriction on a use range of function. The use restriction on a function in this manner is simply called as "lock".

In the illustrative embodiment, a password authentication is adopted as an authentication method for setting of a lock function of the mobile terminal device 10. For example, the lock is released by inputting a password. Incidentally, the authentication method may properly adopt other authentication methods such as a fingerprint authentication or a sound authentication.

The mobile terminal device 10 has a function that can change the setting of the lock having been set in advance for a predetermined function in response to a use state (for example, time of using the mobile terminal device 10, location of the mobile terminal device 10, speed in the movement of the mobile terminal device 10, continuous call duration or accumulated call duration of the mobile terminal device 10, a number of times using the function of the mobile terminal device 10, etc.) of the mobile terminal device 10. Such functions serve to release temporarily a function that is restricted in the use. In contrast, it may impose temporarily a new restriction on the function that is restricted in the use.

The mobile terminal device has a GPS (Global Positioning System) function. The mobile terminal device 10 detects a location of the mobile terminal device itself using the GPS information received from the GPS satellite 20 and an assist data received from the server apparatus 40, by means of the MS-based method.

The GPS information includes navigation data. The navigation data includes time data, ephemeris data, almanac data, etc. The assist data includes navigation data, location data of the base station 30, and time data for demodulating a signal received from the GPS satellite 20.

The method of detecting the location of the mobile terminal device 10 may adopt the Stand Alone method by which the mobile terminal device itself performs all of the detecting processing, or the MS-Assisted method by which the server apparatus 40 performs all of the detecting processing to send only the detected result to the mobile terminal device.

The mobile terminal device 10 performs communication with the base station 30 based on the control of the server apparatus 40 that is connected to a telecommunications network 50. Accordingly, it may perform a phonetic communication, or, sending/receiving of electronic mail, or browsing of WEB site.

The mobile terminal device 10 may be connected to a data terminal 60, for example, by means of USB (Universal Serial Bus), or Bluetooth (Registered trademark). In this case, the mobile terminal device 10 may perform setting of the lock by means of a data terminal 60 which will be described later.

The GPS satellite 20 revolves along a predetermined orbit around the earth and transmits periodically navigation data including time data, ephemeris data, and almanac data, etc. by means of a broadcast.

The base station 30 is connected to the telecommunications network 50. The base station 30 communicates with the mobile terminal device 10 within the cell to perform the data relay between the mobile terminal device and the server apparatus 40.

The server apparatus 40 is connected to the telecommunications network 50. The server apparatus 40 processes various kinds of data input/output from the telecommunications network 50. The various kinds of data may include, for example, audio data, character data, and video data.

The server apparatus 40 receives a navigation data from the GPS satellite 20 and detects the location of the mobile terminal device 10 based on the navigation data. The server apparatus 40 transmits the assist data obtained by the detecting processing to the mobile terminal device 10 through the base station 30. The assist data means a parameter group that is widely used in detecting a location by means of the GPS.

The mobile terminal device 10, the base station 30 and the server apparatus 40 are communicated with each other within the telecommunications network 50. The telecommunications network 50 is a network capable of processing audio data and packet data.

The data terminal 60 is, for example, a personal computer. The data terminal 60 may be connected to the mobile terminal device 10 by means of the USB or Bluetooth. The data terminal 60 is connected to the mobile terminal device 10 to perform data-communication with the mobile terminal device 10, thereby performing the setting of the lock of the mobile terminal device 10.

The data terminal 60 may be connected to the telecommunications network 50. The data terminal 60 has a function of carrying out the sending/receiving of electronic mail and the like and the access to the WEB site, and may perform the receiving/sending of electronic mail with the mobile terminal device 10 via the telecommunications network 50.

The configuration of the mobile terminal device 10 will be described with reference to FIG. 2.

Figure 2:
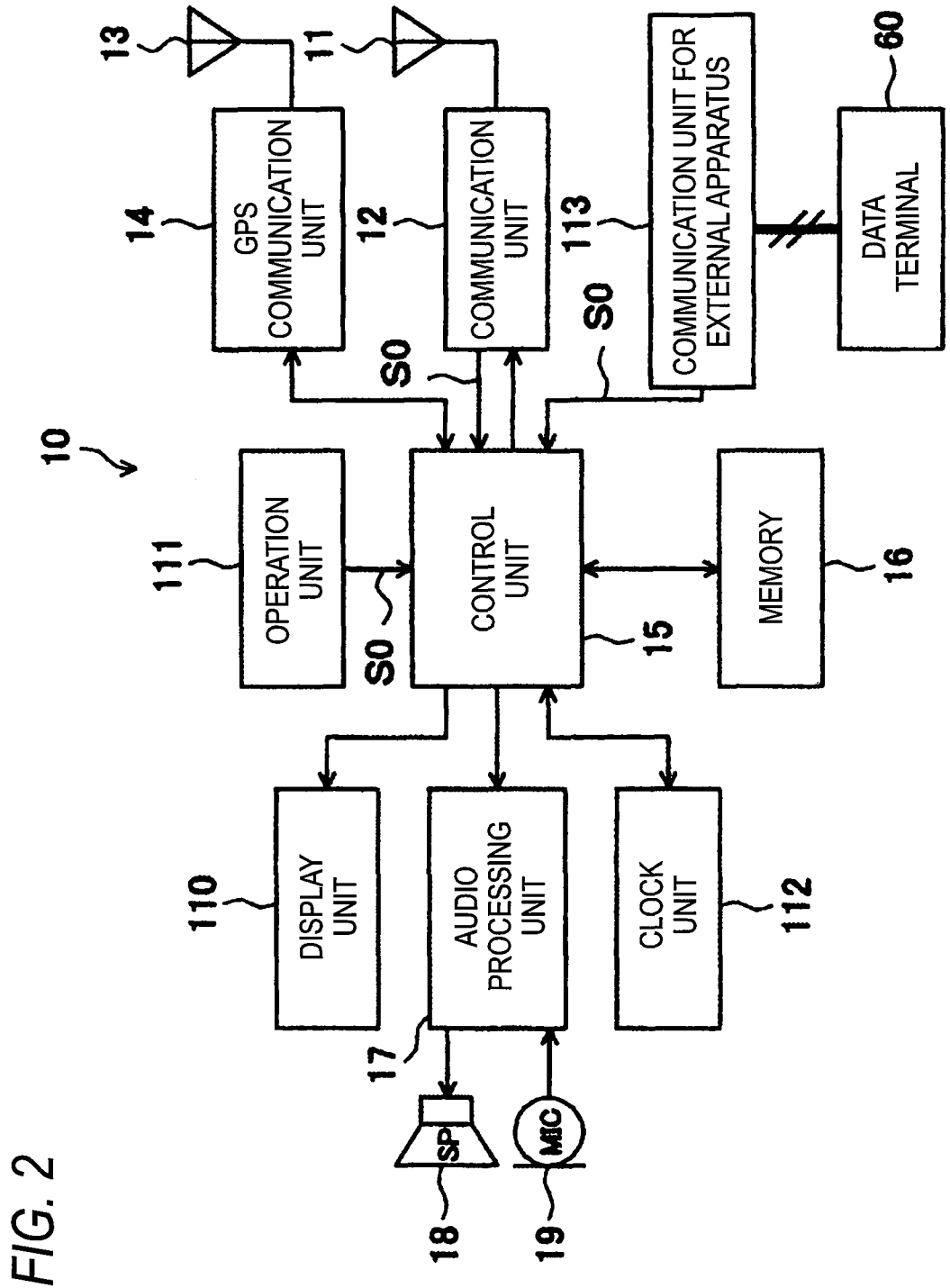
FIG. 2 A schematic block diagram showing the configuration of a mobile terminal device according to an illustrative embodiment of the invention.

FIG. 2 is a schematic block diagram showing the configuration of the mobile terminal device according to the illustrative embodiment of the invention.

The mobile terminal device 10 shown in FIG. 2 includes an antenna 11, a communication unit 12, a GPS antenna 13, a GPS communication unit 14, a control unit 15, a memory 16, an audio processing unit 17, a speaker 18, a microphone 19, a display unit 110, an operation unit 111, a clock unit 112, and a communication unit 113 for external apparatus.

The memory 16 corresponds to a storing unit of the invention. The communication unit 12 and the communication unit 113 for external apparatus correspond to a receiving section of the invention. The clock unit 112 corresponds to a time counting unit of the invention.

The antenna 11 is an internal antenna in the illustrative embodiment of the invention. The antenna 11 transmits electromagnetic waves in a predetermined frequency band to the base station 30, or receives the waves from the base station 30. Alternatively, the antenna 11 may be, for example, a rod antenna.

The communication unit 12 modulates a transmission signal output from the control unit 15 in a predetermined modulation fashion to thereby transmit the modulated transmission signal as a radio signal to the base station 30 through the antenna 11. The communication unit 12 demodulates the radio signal received from the base station 30 through the antenna 11 against the modulation method, thereby outputting the demodulated signal as a receiving signal to the control unit 15.

The GPS antenna 13 receives electromagnetic waves in a predetermined frequency band from the GPS satellite 20.

The GPS communication unit 14 amplifies and modulates the radio signal received from the GPS satellite 20 through the GPS antenna 13, thereby obtaining GPS information including a navigation data. The GPS communication unit 14 outputs the GPS information to a location speed information receiving unit 152 (see FIG. 3) of the control unit 15.

The control unit 15 controls a comprehensive operation of the mobile terminal device 10 so that various kind of processing is performed in an appropriate order in response to a user's manipulation of the operation unit 111.

The processing of the control unit 15 includes, for example, phonetic communication processed through the telecommunications network 50, the application processing for reading electronic mail or browsing the WEB site, and the processing of password authentication. The other processing being performed by the control unit 15 will be described later.

The controls by the control unit 15 include, for example, communication controls of the communication unit 12, GPS communication unit 14, communication unit 113 for external apparatus, controls of access to the memory 16, picture display of the display unit 110, and audio-processing of the audio processing unit 17.

The control unit 15 performs the above processing based on the programs (operating system, application program, etc.) that are stored in the memory 16. The control unit 15 performs the above-described various kinds of processing, or controlling in the order of being instructed by program.

The memory 16 includes, for example, a nonvolatile memory device (flash memory) or random accessible memory devices (SRAM, DRAM).

The memory 16 stores an initial setting information and setting information, which will be described later. The initial setting information and setting information are stored in the memory 16 when a setting information change signal S0 is input from the communication unit 12, the operation unit 111, or the communication unit 113 for external apparatus to the control unit 15. In addition, the memory 16 stores various kinds of data such as an output result of the control unit 15, an application program, a temporary data used in the course of processing of a program, address book, etc. The address book is formed of, for example, name of a counter part of a call, or phone number, etc.

The audio processing unit 17 performs the signal processing such as a digital to analog (D/A) converting and an amplification of a digital audio data supplied from the control unit 15 to output the digital audio data through the speaker 18.

The audio processing unit 17 performs the processing of amplification, analog to digital (A/D) converting, encoding, etc. of the analog audio signal to convert an analog audio signal input from the microphone 19 to a digital audio data thereby outputting the digital audio data to the control unit 15.

The display unit 110 includes a display device, for example, such as a liquid crystal display panel or an organic EL (Electro Luminescence) panel. The display unit 110 displays various kinds of data in response to a picture signal that is supplied from the control unit 15.

The operation unit 111 has a plurality of keys assigned with various kinds of functions such as power key, call key, numeric key, letter key, arrow key, determination key, transmission key. In a case where a user operates the keys, the operation unit 111 generates a corresponding signal in response to the user's manipulation, and outputs the signal to the control unit 15 by the user's instruction.

The clock unit 112 counts time. According thereto, information such as year, month, minute, hour, second can be acquired by use of the clock unit 112. In addition, the clock unit 112 has a counter (not shown), and, accordingly, counts accumulated time. The clock unit 112 outputs the counted time or accumulated time to the lock setting unit 151 (see FIG. 3) of the control unit 15 in response to a request of the control unit 15.

The communication unit 113 for external apparatus is connected to the data terminal 60 via a USB or Bluetooth. The communication unit 113 for external apparatus converts a data input from the data terminal 60 to a data that is controllable by the control unit 15, and outputs the converted data to the control unit 15.

The control unit 15 and the memory 16 will be described in more detail.

Figure 3:
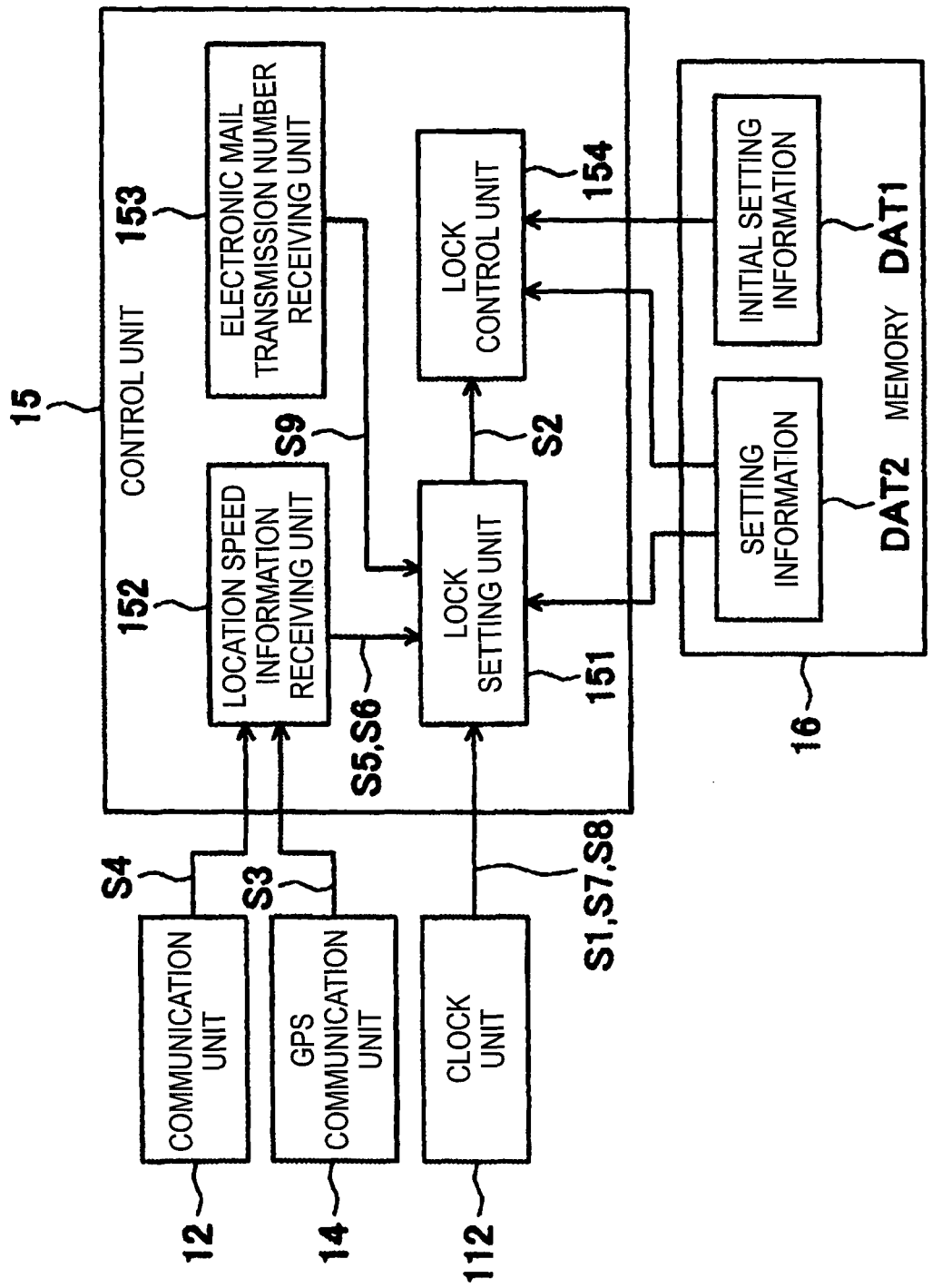
FIG. 3 A schematic block diagram showing a control unit and a memory according to an illustrative embodiment of the invention.

FIG. 3 is a schematic block diagram showing the configuration of the control unit and memory according to an illustrative embodiment of the invention. FIG. 3 also shows other configuration of the communication unit 12 and the like.

As shown in FIG. 3, the control unit 15 includes a lock setting unit 151, a location speed information receiving unit 152, an electronic mail transmission number receiving unit 153, and a lock control unit 154.

Incidentally, the lock setting unit 151 corresponds to a determining unit and a generation unit of the invention. The location speed information receiving unit 152 corresponds to a location information receiving unit and a movement speed information receiving unit of the invention. The electronic mail transmission number receiving unit 153 corresponds to a transmission number receiving unit of the invention. The lock control unit 154 corresponds to a restriction release unit of the invention.

The initial setting information DAT1 corresponds to a setting information of the invention. The setting information DAT2 corresponds to a changed-setting information of the invention.

The lock control unit 154 accesses the initial setting information DAT1 of the memory 16 to lock a call function of the mobile terminal device 10 based on the initial setting information DAT1.

The initial setting information DAT1 includes various kinds of conditions on the lock setting. The initial setting information DAT1 is set by an administrator and stored in the memory 16.

The lock setting unit 151 accesses the memory 16 to read the setting informant DAT2. The setting information DAT2 includes various kinds of conditions on a change condition of the lock. The setting information DAT2 is stored in the memory 16 by the administrator's manipulation.

The lock setting unit 151 is input appropriately with following information in response to the read setting information DAT2.

The information includes time information S1, accumulated call duration information S7 and continuous call duration information S8 input from the clock unit 112.

In addition, the information includes location information S5 and speed information (movement speed information) S6 that are input from the location speed information receiving unit 152 and electronic mail transmission number information S9 that is input from the electronic mail transmission number receiving unit 153.

The lock setting unit 151 determines whether or not the lock change condition is satisfied, based on the information such as the setting information DAT2 and the time information S1 that is input to the lock setting unit 151.

In a case where the change condition of the lock is satisfied, the lock setting unit 151 generates a restriction change request signal S2 to output the restriction change request signal S2 to the lock control unit 154.

The location speed information receiving unit 152 detects a location of the mobile terminal device 10 based on the GPS information S3 input from the GPS communication unit 14 and the assist data S4 that is input from the communication unit 12. The location speed information receiving unit 152 outputs an information on the detected location as location information to the lock setting unit 151.

In addition, the location speed information receiving unit 152 estimates the speed of the mobile terminal device 10 that moves together with a user, based on location data and time data that are included in the GPS information S3 and the assist data S4. The location speed information receiving unit 152 outputs the estimated speed as speed information S6 to the lock setting unit 151.

The electronic mail transmission number receiving unit 153 counts the number of electronic mail transmission. The electronic mail transmission number receiving unit 153 outputs the number of electronic mail transmission as electronic mail transmission number information S9 to the lock setting unit 151.

The lock control unit 154 detects a restriction change request signal S2 output from the lock setting unit 151. If the lock control unit 154 detects the restriction change request signal S2 to release the lock based on the setting information DAT2 of the memory 16. The lock control unit 154 may perform the locking in response to the setting information DAT2.

Figure 4:
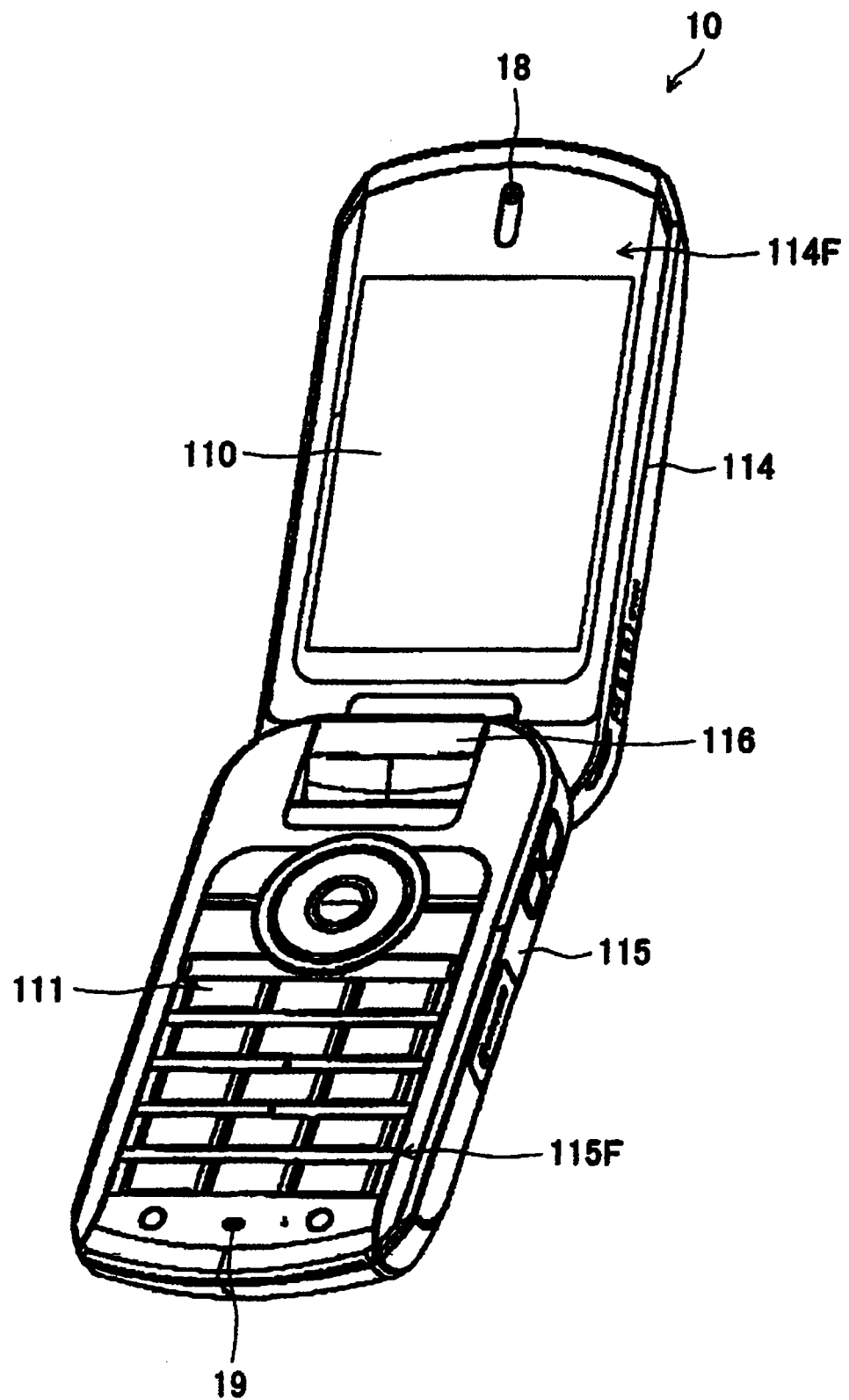
FIG. 4 A perspective view showing an appearance of the mobile terminal device according to an illustrative embodiment of the invention.

The components of the previously mentioned mobile terminal device 10 are arranged in predetermined locations of the upper casing and lower casing shown in FIG. 4.

FIG. 4 is a perspective view showing an appearance of the mobile terminal device according to the illustrative embodiment of the invention.

As shown in FIG. 4, the mobile terminal device 10 includes a upper casing 114 and a lower casing 115 which are connected with each other by means of a hinge 116. The mobile terminal device 10 is a shell type (may be called as a folder type) of mobile terminal device in which the upper casing and lower casing may be opened and closed. FIG. 4 shows an opening state where the upper casing and lower casing are opened.

As shown in FIG. 4, the face 114F of the upper casing 114 is arranged thereon with a display unit 110 and a speaker 18. The face 115F of the lower casing 115 is arranged thereon with various kinds of keys of the operation unit 111 and microphone 19.

The illustrative operations 1 to 7 of the mobile terminal device 10 of the communication system 1 will be explained with reference to FIGS. 3 and 5.

Figure 5:
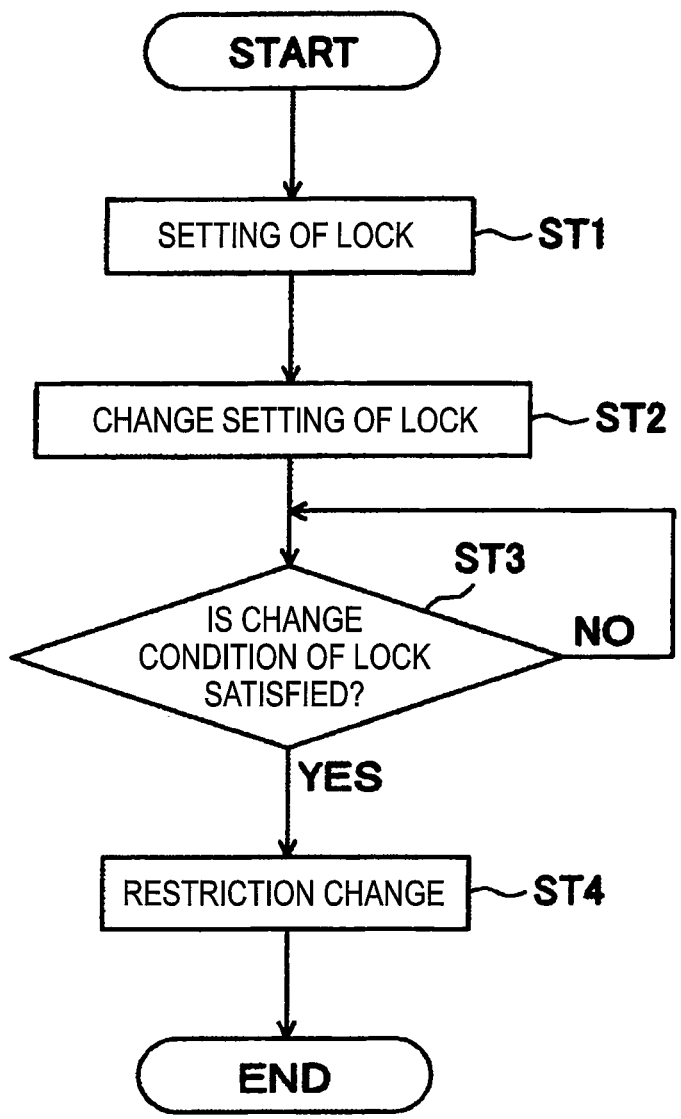
FIG. 5 A flow chart showing an operation of the mobile terminal device forming a communication system according to an illustrative embodiment.

FIG. 5 is a flow chart illustrating the illustrative operations of the mobile terminal device of the communication system according to illustrative embodiment of the invention.

In the illustrative operations 1 to 7 below, the following states will be introduced.

For example, it is assumed that each of employees (may be called a user) with an A company carries the mobile terminal device 10. An administrator with the A company may perform the locking of each of the mobile terminal devices 10 to restrict a called party. The called party may be persons registered in the address book.

Incidentally, the administrators may be persons who can perform the setting of the lock of the mobile terminal device 10 by means of a password authentication.

Accordingly, each of the employees who does not know the password cannot call to persons other than persons registered in the address book. The administrator may change the setting of the lock under a predetermined condition, which will be explained hereinafter, by considering the employees' convenience.

(First Illustrative Operation)

The first illustrative operation will be explained with reference to FIG. 5.

(Step ST1)

The administrator manipulates the operation unit 111 of the mobile terminal device 10 to set the lock of the mobile terminal device 10. The setting of the lock is to set the lock on the call function thereby limiting a called party to a person registered in the address book. The setting of the lock is performed after the authentication of password.

The setting of the lock by the administrator is stored as initial setting information DAT1 in the memory 16 through the control unit 15.

The lock control unit 154 accesses the initial setting information DAT1 of the memory 16 to set the lock on the call function of the mobile terminal device 10. Accordingly, the called party is restricted to persons registered in the address book.

(Step ST2)

The administrator manipulates the operation unit 111 of the mobile terminal device 10 to perform the change setting of the lock of the mobile terminal device 10. The change setting of the lock is to restrict a called party to a person registered in the address book during business hours only (for example, from 9 am to 5 pm on weekdays). At this time, the set time is referred to as a setting time.

The change setting of the lock by the administrator is stored as setting information DAT2 in the memory 16 through the control unit 15, when the setting information change signal S0 is input (see FIG. 2).

(Step ST3)

The lock setting unit 151 monitors the record of the setting information DAT2 in the memory 16, and, at the same time, monitors the period of time counted by the clock unit 112. The lock setting unit 151 detects the record of the setting information DAT2 in the memory 16 to read the setting information DAT2.

Thereafter, the lock setting unit 151 determines whether or not the change condition of the lock is satisfied, based on the time information S1 input from the clock unit 112.

The change condition of the lock is a condition where the present time is beyond the period of time set in the setting information DAT2. For example, when the time counted by the clock unit 112 is not on business hours, the lock setting unit 151 determines that the change condition of the lock is satisfied.

If the lock setting unit 151 determines that the change condition of the lock is satisfied (YES), the lock setting unit 151 generates a restriction change request signal S2 to output the signal S2 to the lock control unit 154.

On the other hand, if the lock setting unit 151 determines that the change condition of the lock is not satisfied (NO), the lock setting unit 151 again determines whether or not the change condition of the lock is satisfied.

(Step ST4)

The lock control unit 154 detects a restriction change request signal S2 output from the lock setting unit 151, thereby releasing the lock set in step ST1 based on the setting information DAT2 of the memory 16.

Accordingly, after business hours, the employees may freely select the called party without the restriction on the called party.

In step ST1 and step ST3, the administrator manipulates the operation unit 111 of the mobile terminal device 10 to set the lock. Alternatively, the administrator may set the lock of the mobile terminal device 10 in the following operation method. The following operation method will be explained with reference to the processing in step ST1 as an example. Incidentally, in the case of step ST3, the initial setting information is just read to setting information.

According to the illustrative embodiment of the invention, the initial setting information DAT1 and the setting information DAT2 are stored separately in different memory regions of the memory 16, but the setting information DAT2 may be overwritten in the memory region of the initial setting information DAT1.

(Illustrative Application of Operation Method 1)

In the illustrative application of operation method 1, the lock of the mobile terminal device 10 is set by means of an operation of the data terminal 60.

In more detail, the administrator connects the data terminal 60 to the communication unit 113 for external apparatus of the mobile terminal device 10. The administrator manipulates the data terminal 60, thereby the setting of the lock is input as an initial setting information in the communication unit 113 for external apparatus.

The initial setting information is converted to data that can be processed by the control unit 15, by means of the communication unit 113 for external apparatus. Thereafter, the initial setting information is stored as initial setting information DAT1 in the memory 16 through the control unit 15 when the setting information change signal S0 is input from the communication unit 113 for external apparatus to the control unit 15.

According to the illustrative application of operation method 1, the data terminal 60 may be replaced with a personal computer. Accordingly, it gets the setting of the lock data-based according to each employee, thereby there is an advantage that the setting of the lock of a plurality of mobile terminal devices 10 may be performed at once.

(Illustrative Application of Operation Method 2)

According to the illustrative application of the operation method 2, the setting of the lock of the mobile terminal device 10 may be performed by means of the remote control of electronic mail and the like.

In more detail, the administrator manipulates, for example, the data terminal 60 to write electronic mail relating to the setting of the lock and transmit the electronic mail to the mobile terminal device 10. The electronic mail may be described by command for performing the setting of the lock.

The communication unit 12 of the mobile terminal device 10 receives the electronic mail from the base station 30 through the communications network 50, and performs the demodulation of the electronic mail. The electronic mail is stored as initial setting information DAT1 in the memory 16 by the control unit 15 when the setting information change request signal S0 is input from the communication unit 12 to the control unit 15 (see FIG. 2).

Incidentally, instead of the electronic mail, the short message service or WEB may be used.

According to the illustrative application of the operation method 2, there is an advantage that setting of the lock may be performed by means of the remote control of the electronic mail.

In step ST1, setting of the lock may be performed on the restriction of browsing the WEB site, the use restriction of electronic mail, the restriction of various kinds of functions of the mobile terminal device 10.

In the illustrative operation as mentioned above, in step ST4, releasing of the lock was explained as an example. In contrast, in step 4, a function of the mobile terminal device 10 that a user wants may be locked. Hereinafter, the detailed illustrative embodiment will be described.

After step ST1, an administrator may set a change condition of the lock to restrict browsing of the WEB site during business hours (Step ST2). If it is on business hours (Step ST3), browsing of the WEB site is restricted (Step ST4).

According to the illustrative embodiment of the invention, an administrator may randomly and accurately control the restriction or the release on a function of the mobile terminal device 10. As a result, there is an advantage that a user who cannot carry out the control of the lock does not need to request a change of the lock to the administrator.

(Second Illustrative Operation)

The second illustrative operation will be explained. In the second illustrative operation, the location in which a user may call is limited to a predetermined area near the build of A company during business hours. Hereinafter, the difference from the second illustrative operation will be explained.

In step ST2, the administrator performs the change setting of the lock to limit to near the building of A company as a location where a user may call only during business hours. The set location is stored as predetermined information DAT2 in the memory 16.

After step ST2, step ST3 is performed. The change condition of the lock in step ST3 is that the location of the mobile terminal device 10 is out of the range of the predetermined region of the setting information DAT2.

At this time, the GPS communication unit 14 receives the GPS information S3 from the GPS satellite 20, and, at the same time, the communication unit 12 receives the assist data S4 from the server apparatus 40 through the telecommunications network 50.

The location speed information receiving unit 152 is input thereto with the GPS information S3 from the GPS communication unit 14, and, at the same time, input thereto with the assist data S4 from the communication unit 12.

When the GPS information S3 and assist data S4 are input, the location speed information receiving unit 152 estimates the location information S5 of the mobile terminal device 10 and outputs the location information to the lock setting unit 151.

The lock setting unit 151 determines whether or not the change condition of the lock is satisfied, based on the time information S1 and location information S5. The time information S1 was explained in the first illustrative operation.

In more detail, the lock setting unit 151 is input thereto with the location information S5 from the location speed information receiving unit 152, and, at the same time, input thereto with the time information S1 from the clock unit 112.

The lock setting unit 151 determines whether or not the location of the location information 55 is beyond the range of the setting region of the setting information DAT2. In addition, the lock setting unit 151 determines whether or not the present time of the time information S1 is out of range of the setting time of the setting information DAT2.

When the location of the mobile terminal device 10 is out of range of the setting region, and, also, the current time is out of range of business hours, the lock setting unit 151 determines that the change condition of the lock is satisfied.

When the result of the determination of the lock setting unit 151 satisfies the change condition of the lock (YES), the processing in step ST4 is executed. On the other hand, when the result of the determination of the lock setting unit 151 does not satisfy the change condition of the lock (NO), the processing in step ST3 is executed.

According to the second illustrative operation, there is an advantage that the lock may be controlled according to the location of the mobile terminal device 10, in addition to the time.

(Third Illustrative Operation)

The third illustrative operation will be explained. In the third illustrative operation, while an employee who carries the mobile terminal device 10 moves by using a vehicle or public transportation, the employee is restricted on making a phone call.

In step ST1, the administrator does not set the restriction on a function of the mobile terminal device 10.

In step ST2, while an employee who carries the mobile terminal device 10 moves by using a vehicle or public transportation, the administrator performs the change setting of the lock to prevent the employee from making a call. The setting information DAT2 includes a setting speed relating to speed (for example, walking speed).

After step ST2, step ST3 is performed. The change condition of lock in step ST3 is such that the speed of the mobile terminal device 10 (briefly, refer to as speed of the mobile terminal device 10) moving together with the employee is out of range of the setting speed of the setting information DAT2.

At this time, likewise with the case of the second illustrative operation, the location speed information receiving unit 152 is input thereto with the GPS information S3 and assist information S4.

The location speed information receiving unit 152 estimates the speed of the mobile terminal device 10, based on location data and time data that are included in the GPS information and assist data S4. The location speed information receiving unit 152 outputs the estimated speed as a speed information S6 to the lock setting unit 151.

The lock setting unit 151 determines whether or not the change condition of the lock is satisfied based on the speed information S6. In more detail, the lock setting unit 151 determines whether or not the speed in the speed information S6 is out of range of the setting speed of the setting information DAT2.

When the speed of the mobile terminal device 10 is more than the setting speed, the lock setting unit 151 determines that the change condition of the lock is satisfied.

As a result of the determination of the lock setting unit 151, when the change condition of the lock is satisfied (YES), the processing in step ST4 is executed. On the other hand, when the result of the determination of the lock setting unit 151 does not satisfy the change condition of the lock (NO), step ST3 is performed.

According to the third illustrative operation, there is a feature that the lock may be controlled according to a user's conditions. Such a method of changing the setting of the lock may make an attempt on a user's safety during his movement.

(Fourth Illustrative Operation)

The fourth illustrative operation will be explained. According to the fourth illustrative operation, when the accumulated call duration of the mobile terminal device 10 is more than a predetermined amount of time, a call is restricted. The accumulated call duration is the total time during a predetermined period of time a user calls.

In step ST1, it supposes that the administrator has not set a function restriction on the mobile terminal device 10.

In step ST2, when the accumulated call duration is more than a predetermined amount of time (for example, 1 hour), the administrator performs the change setting of the lock to prevent a call. The setting information DAT2 includes a predetermined time relating to the accumulated call duration.

After step ST2, step ST3 is executed. The change condition of the lock in step ST3 is the condition that the accumulated call duration counted by the clock unit 112 is more than the predetermined amount of time of the setting information DAT2.

At this time, the clock unit 112 counts the accumulated call duration to output the accumulated call duration as an accumulated call duration information S7 to the lock setting unit 151. The lock setting unit 151 determines whether or not the accumulated call duration of the accumulated call duration information S7 is over the setting amount of time of the setting information DAT2.

When the accumulated call duration is more than the set amount of time, the lock setting unit 151 determines that the change condition of the lock is satisfied.

When a result of the determination of the lock setting unit 151 satisfies the change condition of the lock (YES), step ST4 is executed. On the other hand, when the result of the determination of the lock setting unit 151 does not satisfy the change condition of the lock (NO), step ST3 is executed.

According to the fourth illustrative operation, there is a feature that the lock may be controlled according to the accumulated call duration. By such a manner of performing the setting change of the lock, charging policy, etc. may be attempted.

(Fifth Illustrative Operation)

The fifth illustrative operation will be explained. In the fifth illustrative operation, the continuous call duration is restricted. The continuous call duration is a period of time that a call continues from the start thereof to the end thereof without stopping.

In step ST1, it supposes that the administrator has not set the restriction on a function of the mobile terminal device 10.

In step ST2, when the continuous call duration is over a predetermined period of time (for example, 30 minutes), the administrator performs the change setting of the lock to restrict a call. The setting information DAT2 includes a set period of time relating to the continuous call duration.

After step ST2, step ST3 is executed. The change condition of the lock in step ST3 is the condition of whether or not the continuous call duration by the clock unit 112 is over the predetermined period of time of the setting information DAT2.

At this time, the clock unit 112 counts the accumulated amount of time of a continuous call to output the continuous call duration as a continuous call duration information S8 to the lock setting unit 151. The lock setting unit 151 determines whether or not the continuous call duration of continuous call duration information S8 is over the set duration of the setting information DAT2.

When a result of the determination of the lock setting unit 151 satisfies the change condition of the lock (YES), the processing in step ST4 is executed. On the other hand, when the result of the determination of the lock setting unit 151 does not satisfy the change condition of the lock (NO), the processing of step ST3 is executed.

According to the fifth illustrative operation, there is an advantage that the lock may be controlled according to the continuous call duration. Such a method of changing the setting of the lock may make an attempt on a charging policy and the like.

(Sixth Illustrative Operation)

The sixth illustrative operation will be explained. In the sixth illustrative operation, the transmission number of times of electronic mail is restricted.

In step ST1, it supposes that the administrator has not set the restriction on a function of the mobile terminal device 10.

In step ST2, when the number of times of electronic mail transmission is over the set number (for example, 10 calls), the administrator performs the change setting of the lock to restrict a call.

After step ST2, step ST3 is executed. In step ST3, the change condition of the lock is the condition that the number of times in transmission of electronic mail is over the set number of the setting information DAT2.

At this time, the electronic mail transmission number receiving unit 153 counts the number of times of electronic mail transmission, thereby outputting the number of electronic mail transmission as an electronic mail transmission number information S9 to the lock setting unit 151. The lock setting unit 151 determines whether or not the number of electronic mail transmission of the electronic mail transmission number information S9 is over the set number of the setting information DAT2.

When a result of the determination of the lock setting unit 151 satisfies the change condition of the lock (YES), step ST4 is executed. On the other hand, when the result of the determination of the lock setting unit 151 does not satisfy the change condition of the lock (NO), step ST3 is performed.

According to the sixth illustrative operation, there is a feature that the lock may be controlled according to the number of times of electronic mail transmission. Such a method of changing the setting of the lock may make an attempt on a charging policy and the like.

The previously mentioned first to sixth illustrative operations may automatically be performed by the change condition being scheduled according to data and time information.

The previously described first to sixth illustrative operations may variously be combined likewise with the second illustrative operation. For example, the first and fifth illustrative operations may be combined, thereby the called party and the number of electronic mail transmission may be restricted only during a required period of time.

The change setting of the lock of a plurality of functions of the mobile terminal device 10 may be performed with one change condition only. For example, the restriction on electronic mail, browsing of the WEB site and called party is locked at once according to the accumulated call duration as determined. Thus, the illustrative embodiment of the invention may be changed variously.

In the illustrative embodiment of the invention, although the invention exemplifies the mobile terminal device as a mobile phone, the invention may be applied to a PDA (Personal Digital Assistant) having the same configuration as described in the illustrative embodiment of the invention, and a notebook type of personal computer, etc.

Although the invention is described in detail and with reference to a specific type of illustrative embodiment, it is obvious for a skilled person to add a change or a modification to the invention without departing from the spirit and the scope thereof.

The application is based on Japanese Patent Application No. 2008-206405, filed on Aug. 8, 2008, and the contents of which are hereby incorporated herein by reference.

Industrial Applicability

According to the present invention, setting of a lock of a mobile terminal device may easily be performed thereby it is useful to a mobile terminal device such as a mobile phone having a lock function and a method of setting the lock.

DESCRIPTION OF REFERENCE NUMERALS AND SIGNS

1: communication system
10: mobile terminal device
11: antenna
12: communication unit
13: GPS antenna
14: GPS communication unit
15: control unit
16: memory (storing unit)
17: audio processing unit
18: speaker
19: microphone
110: display unit
111: operation unit
112: clock unit (time counting unit)
113: communication unit for external apparatus 114: upper casing
114F: surface of upper casing
115: lower casing
115F: surface of lower casing
116: hinge
151: lock setting unit (determining unit and generation unit)
152: location speed information receiving unit (location information receiving unit and movement speed information unit)
153: electronic mail transmission number receiving unit (transmission number receiving unit)
154: lock control unit (restriction release unit)
DAT1: initial setting information (setting information)
DAT2: setting information (changed setting information)
20: GPS satellite
30: base station
40: server apparatus
50: telecommunications network
60: data terminal
S0: setting information change signal
S1: time information
S2: restriction change request signal
S3: GPS information
S4: assist data
S5: location information
S6: speed information (movement speed information)
S7: accumulated call duration information
S8: continuous call duration information
S9: electronic mail transmission number information

The invention claimed is:

1. A mobile terminal device comprising:
a storing unit that stores a first condition for a release of a restriction to at least one function of the mobile terminal, and a second condition for changing the first condition;
a communicating unit that requests a changing condition, which changes the first condition of the storing unit, and receives the changing condition; and
a control unit,
wherein when the control unit determines that the second condition is satisfied, the control unit controls the communicating unit to transmit a request signal requesting the changing condition, and controls the storing unit to store the changing condition received by the communicating unit, and when the control unit determines that the second condition is not satisfied, the control unit determines again whether the second condition is satisfied or not,
wherein, when the first condition is satisfied, the control unit releases the restriction to the at least one function of the mobile terminal, and when the first condition is not satisfied, the control unit sets the restriction to the at least one function of the mobile terminal, and
wherein, when the changing condition is satisfied, the control unit releases the restriction under the stored first condition, and when the changing condition is not satisfied, the control unit sets the restriction under the stored first condition.

2. The mobile terminal device according to claim 1, further comprising:
a location unit that obtains a locating information on a location of a terminal device itself,
wherein the second condition includes a locating condition of the terminal device itself, and
wherein, when the locating condition is satisfied, the control unit lets the communicating unit transmit the request signal.

3. The mobile terminal device according to claim 1, further comprising:
a speedometer unit that obtains a movement information resulting from the movement of the terminal device itself,
wherein the second condition includes a movement condition of the terminal device itself, and
wherein, when the movement condition is satisfied, the control unit lets the communicating unit transmit the request signal.

4. The mobile terminal device according to claim 1, further comprising:
a counting unit that counts time,
wherein the second condition includes a time condition,
wherein, when the time condition is satisfied, the control unit lets the communicating unit transmit the request signal.

5. The mobile terminal device according to claim 4,
wherein the counting unit counts accumulative time of the counted time, and
wherein the time condition is in accordance with accumulative time.

6. The mobile terminal device according to claim 1, further comprising:
a function of processing electronic mail; and
a transmission number receiving unit that obtains a transmission number information on the number of times of electronic mail transmission of the mobile terminal device itself,
wherein the second condition includes a condition of the number of times of electronic mail transmission, and
wherein the control unit determines whether or not the obtained number information satisfies the condition of the number of times of electronic mail transmission.

7. A method of setting a lock of a mobile terminal device comprising:
storing, by the mobile device, in a storing unit a first condition for a release of a use restriction to at least one function of the mobile terminal device and a second condition for changing the first condition;
determining, by the mobile device, whether the second condition is satisfied;
when the second condition is satisfied:
requesting, by the mobile device, a change in the first condition stored in the storing unit;
receiving, by the mobile device, a changing condition;
storing, by the mobile device, the received changing condition in the storing unit;
when the second condition is not satisfied:
determining again, by the mobile device, whether the second condition is satisfied or not, and
when the first condition is satisfied:
performing releasing, by the mobile device, of the use restriction to the at least one function of the mobile terminal device itself, and when the first condition is not satisfied, setting, by the mobile device, the restriction to the at least one function of the mobile terminal, wherein
when the changing condition is satisfied:
the mobile device releases the restriction under the stored first condition, and when the changing condition is not satisfied:
the mobile device sets the restriction under the stored first condition.

* * * * *